Oct. 3, 1939.  L. F. VANDEGRIFT  2,175,043
FRYING GRIDDLE
Filed Jan. 19, 1939
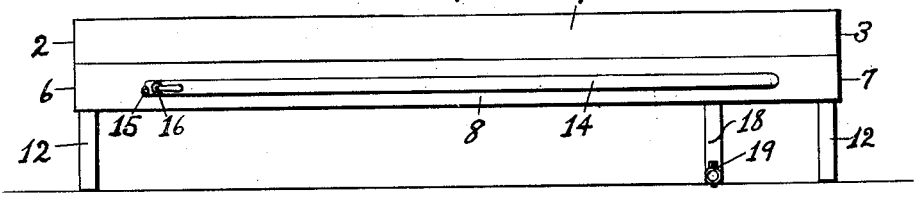
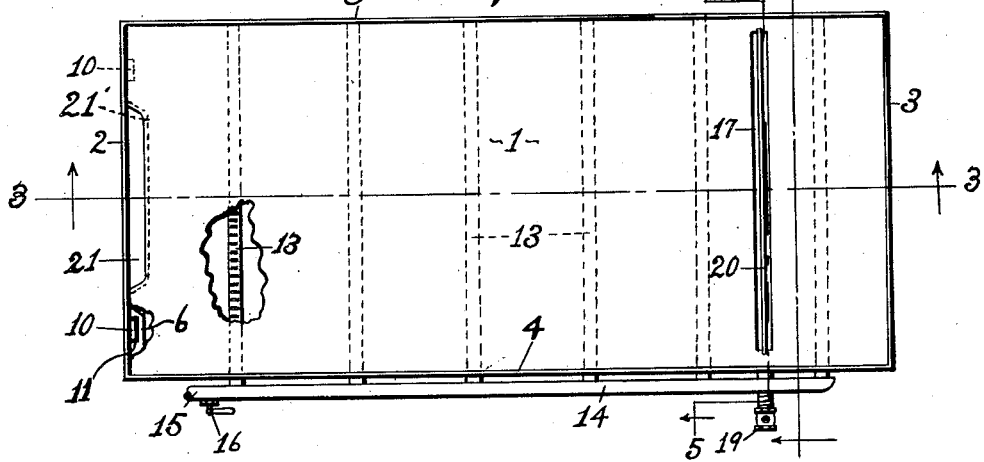
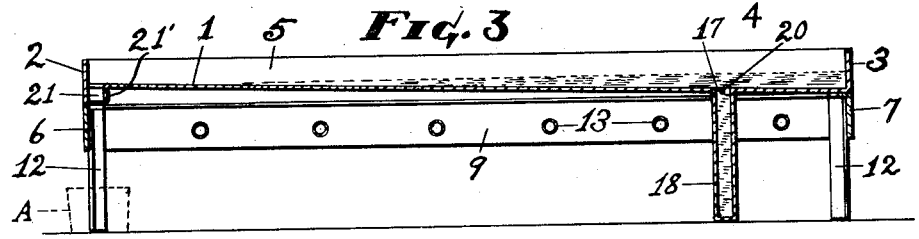
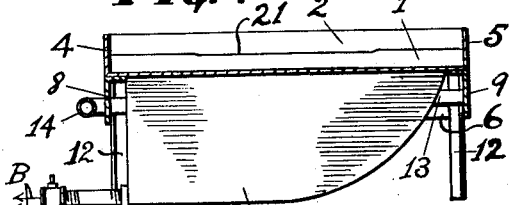
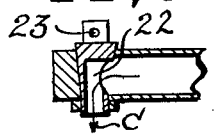
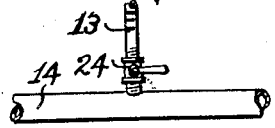
INVENTOR.
LEROY F. VANDEGRIFT
BY U. G. Charles
ATTORNEY.

Patented Oct. 3, 1939

2,175,043

UNITED STATES PATENT OFFICE 2,175,043

FRYING GRIDDLE

Leroy F. Vandegrift, Shawnee, Okla.

Application January 19, 1939, Serial No. 251,715

1 Claim. (Cl. 53—5)

My invention relates to improvements in a frying griddle, and has for its principal object means to remove accumulated particles that commonly occur in the process of frying food substance to avoid said particles from being in contact with the directly heated portion of the griddle whereby the possibility of scorching particles to such an extent as to contaminate the grease with its fume is obviated, and a simple and efficient means to remove said particles from time to time as they accumulate.

A further object of my invention is to provide a griddle having side walls, a sloping bottom and a sediment catch receptor transversely crossing the bottom in close proximity to its maximum depth with respect to the downward slope of the bottom to receive molten grease from the griddle, and the receptor being provided with an efficient adjustable drain adjacent the bottom thereof.

A still further object of my invention is to provide means at the mouth of the receptor functioning as a strainer as restricting means for coarse particles passing therethrough, and an opening at the other end of the griddle through which the coarse particles may be discharged by the operator of the griddle for future disposal.

A still further object of my invention is to provide a griddle inexpensive to construct, simple to operate, efficient in its performance and economy with respect to a restricted quantity of grease required for full and complete performance while in action, furthermore, the arrangement is means to prolong the purity of the grease.

These and other objects will hereinafter be more fully explained, reference being had to the accompanying drawing forming a part of this specification in which like characters will apply to like parts in the different views.

Referring to the drawing:

Fig. 1 is a front side view of the griddle.

Fig. 2 is a plan view of Fig. 1.

Fig. 3 is a sectional view taken on line 3—3 in Fig. 2 looking in the direction of the arrows.

Fig. 4 is a cross sectional view taken on line 4—4 in Fig. 2.

Fig. 5 is an enlarged cross sectional view taken on line 5—5 in Fig. 2, parts removed for convenience of illustration.

Fig. 6 is an enlarged sectional view through the clean out valve as modified.

Fig. 7 is a fragmentary plan view of the burner structure.

The component parts of my invention herein disclosed consist of a bottom 1 having ends and side walls, 2, 3, 4 and 5, respectively, integrally joined and connected to the bottom fluid tight, said bottom slopingly positioned within said walls, the slope uniformly extending downward from end wall 2 to where it joins end wall 3 as shown in Fig. 3 and for the purpose later described.

It will be seen that the said griddle has a supporting frame consisting of ends and side rails 6, 7, 8 and 9, respectively, said rails being L-shaped with respect to cross section, the outer surface of which is vertically alined with the outside surface of said griddle walls and so retained by lugs 10 secured to the inside of wall 2. The lower ends of the lugs will engage in apertures 11 that conform peripherally to the lugs and in which the same will removably engage, the apertures being punched through the horizontal portion of end wall 6, the position of which is shown in Fig. 3.

The said supporting frame has a leg 12 secured to each corner thereof as carrying means therefor and in said frame is positioned a series of burners 13 extending thereacross and spaced therealong as heating means for the griddle, said burners being supplied with fuel gas through the medium of a manifold 14 whose supply is fragmentarily shown as at 15 that extends to a source of supply, the latter not shown in the drawing, and the said burners being controlled by a valve 16 positioned at the intake end of the manifold.

Positioned a short distance from end wall 3 and transversely crossing the bottom of the griddle is a slot 17 in registry with the opening of a grease and sediment receptor 18 integrally joined fluid tight. The said receptor extends downward as shown in Figs. 1 and 3 to 5 inclusive, one end portion of which is arced downward and toward the other end thereof to incline the flow of sediment to an outlet valve 19 as an exit for the sediment and through which molten grease will flow when the valve is opened. The purpose of the said receptor being downwardly positioned is means to avoid frying temperature thereto as the burners are adjacent the top thereof. Being so arranged sedimentation settling along the bottom of the receptor will not be scorched or charred by the frying heat, therefore the danger of burnt contamination of the grease is eliminated.

To insure against clogging of the sediment as it enters the slot there is provided a rod 20 centrally positioned with respect to the slot transversely; each end portion of the rod being seated in such a way at their respective end of the slot to maintain a narrow space between said rod and each adjacent side of the slot thereto functioning as a strainer, the said rod being so seated is removable as means to enter a scraper for the removal of sediment deposit in the receptor toward the clean out valve, ejecting the sediment therethrough. By the said strainer arrangement coarse particles separating from the frying substance are barred from entering the receptor and such coarse sediment is removed by scraping the same toward the other end of the griddle where it leaves the molten grease to be disposed of through an elongated opening 21 around which is positioned a flange 21' extending downward from whence the sediment is free to enter an appropriate container placed under said opening, the position of which is shown by dotted lines in Fig. 3.

It will be understood that all sediment is first scraped to and fro across the said strainer as disposing means for the finer substance which otherwise would remain on the bottom of the griddle subjecting itself to being burnt as above referred to, furthermore, the slope of the bottom is means to cause the flow of sediment toward the mouth of the receptor during agitation of the grease as a natural occurrence, while frying substance, with an appropriate kitchen utensil such as is commonly employed with griddle service.

In Figs. 1, 2 and 4 is shown a valve having an axial discharge as shown by arrows B in Fig. 4. The said valve may be modified to discharge transversely to the axis of the body portion as shown in Fig. 6, last said valve consisting of a hollow cylindrical core 22 and adapted to discharge at the lower end thereof as indicated by arrow C, said valve core being shown in its open position and to close the same a suitable pin is positioned in the aperture 23 at the upper end thereof to turn the core through an arc of 180 degrees; being so positioned the hollow of the body portion is closed. Other modifications may be employed with respect to valve construction as long as they provide ample exit for the sediment above referred to.

A further modification with respect to the burners is illustrated in Fig. 7, in which case the burners may be individually controlled by a valve 24 while in Figs. 1 and 2 is shown the control valve 16 positioned in the manifold. By this arrangement all of the burners may be controlled simultaneously, and furthermore, the arrangement with respect to valve 16 may be applied to the manifold illustrated in Fig. 7, in which case each burner valve may be opened if the operator so desires whereby the burners will be controlled simultaneously as above set forth in Figs. 1 and 2.

While I have shown a particular slope of the griddle, as indicated by the grease level shown in Fig. 3, I do not wish to be so restricted as the same may vary from that which is shown but in any case the portion of the bottom adjacent the opening 21 should not be submerged by the grease to avoid waste thereof when coarse sediment is moved toward said opening and furthermore, fried substance may be stacked on the bottom from contact with the grease, and such other modifications may be employed as lie within the scope of the appended claim.

Having fully described my invention what I claim as new, and desire to secure by Letters Patent is:

In a frying griddle, a griddle of the class described comprising a bottom, sides and end walls, the bottom slopingly positioned from one end to the other, there being an elongated opening through the bottom adjacent the end wall at the high point of the bottom and an elongated slot through the bottom a spaced distance inward from the other end wall, a rod positioned in the slot longitudinally extending therealong as a sediment guard whereby the slot is divided with respect to cross section, a receptor for grease pendantly carried by the bottom and in registry with the slot, the bottom of the receptor sloping from one end toward the other, and a valve to withdraw grease from the receptor.

LEROY F. VANDEGRIFT.